Oct. 20, 1970
T. O. PAINE, DEPUTY
ADMINISTRATOR OF THE NATIONAL AERONAUTICS
AND SPACE ADMINISTRATION
SELF-BALANCING STRAIN GAGE TRANSDUCER
Filed July 5, 1968
3,534,592
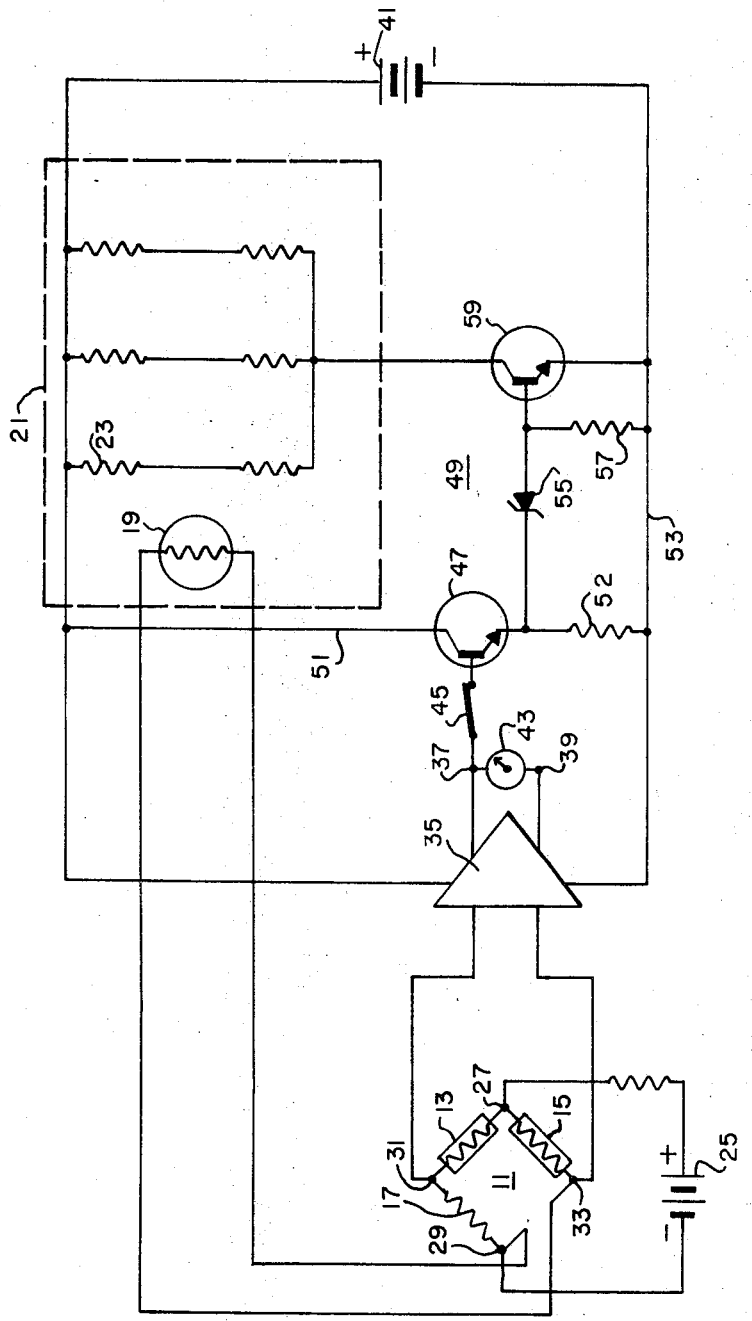
INVENTOR
BILLY D. BABB
BY
ATTORNEYS 
United States Patent Office 3,534,592
Patented Oct. 20, 1970

3,534,592
SELF-BALANCING STRAIN GAGE TRANSDUCER
T. O. Paine, Deputy Administrator of the National Aeronautics and Space Administration, with respect to an invention of Billy D. Babb, Madison, Ala.
Filed July 5, 1968, Ser. No. 742,816
Int. Cl. G01b 7/18
U.S. Cl. 73—88.5                    5 Claims

ABSTRACT OF THE DISCLOSURE

A strain gage transducer of the bridge circuit type in which the values of components in the active branch and the ratio branch are chosen so as to initially unbalance the bridge circuit in a predetermined direction. A thermally responsive resistor is included in the radio branch of the bridge circuit and a control circuit, responsive to bridge unbalance, is provided for heating and consequently varying the resistance of the thermally responsive resistor in a direction and amount to balance the bridge circuit.

---

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

This invention relates to strain gage transducers and more particularly to a self-balancing bridge circuit for measuring strain.

Most bridge circuits for measuring strain are modifications or adaptions of the standard Wheatstone or four arm bridge. A strain gage is connected in at least one of the arms and the bridge circuit is balanced so that the potential across the bridge output is zero when the strain gage is in an unstressed condition. If the strain gage is then placed under stress, the resulting change in resistance of the strain gage will cause an unbalance in the potential across the bridge output and this difference in potential is a measure of the stress applied to the strain gage.

Heretofore, electromechanical servo techniques have been employed to provide self-balancing bridge circuits. In these systems the difference in potential across the bridge output is used as a control signal to drive a servo motor which in turn controls a potentiometer placed in one of the arms of the bridge circuit. These systems are necessarily heavy and have large power requirement and while these limitations may not be critical for use on earth, they become increasingly important for use in extraterrestrial environments where severe limitations are placed on the weight and power requirements of instruments.

Accordingly, it is an object of this invention to provide a self balancing bridge circuit for measuring strain.

Another object is to provide a small, lightweight automatic system for balancing a strain gage bridge circuit.

SUMMARY OF THE INVENTION

It is now proposed to provide a simple and reliable means for balancing the output of a bridge type strain gage transducer. More particularly, this is to be accomplished by the novel technique of including in the ratio branch of the bridge circuit a resistor having a value which will initially unbalance the bridge circuit in a predetermined direction. This technique coupled with the unique use of a thermally responsive resistor also placed in the ratio branch allows the bridge circuit to be balanced by providing means responsive to the bridge unbalance for varying the temperature of the thermally responsive resistor until balance is obtained.

DESCRIPTION OF THE DRAWING

Other objects and advantages will become apparent from the following description with reference to the accompanying drawing in which:

The sole figure is a schematic diagram of a self-balancing strain gage transducer embodying the present invention.

DESCRIPTION OF THE PREFERRED EMBODIMENT

Referring now to the drawing, there is shown a Wheatstone bridge network 11 having an active branch comprising strain gage resistors 13 and 15 and having a ratio branch comprising bridge completion resistor 17 and thermally sensitive resistor 19. Resistor 19 can comprise a thermistor or, alternately, any of the other types of thermally sensitive resistance elements.

As shown schematically in the drawing, thermistor 19 is mounted, in conventional fashion, within a heater block 21 in heat exchanging relationship with heater resistors typically identified by reference numeral 23. The heat generated by the heater resistors will heat the thermistor, thereby changing its resistance.

A power source such as battery 25 has its output terminals connected across the input terminals 27 and 29 of the bridge. The output terminals 31 and 33 of the bridge are connected to the input terminals of differential amplifier 35 for providing between the output terminals 37 and 39 thereof an amplified replica of the difference in potential appearing between terminals 31 and 33. Differential amplifier 35 obtains its energization from a DC source such as battery 41 and energizes a voltmeter 43 or any other suitable indicating instrument. A relative increase in the potential of terminal 31 with respect to terminal 33 will cause output terminal 37 to become positive with respect to output terminal 39 and a relative decrease in the potential of terminal 31 with respect to terminal 33 will cause output terminal 37 to become negative with respect to output terminal 39, so that the meter indication represents the amount and direction of bridge unbalance.

In the operation of the invention the values of resistor 17, thermistor 19 and strain gages 13 and 15 are chosen so that the bridge circuit 11 will be initially unbalanced and the type of thermistor (i.e., either one having a negative or positive coefficient of temperature) is chosen so that increasing its temperature will vary its resistance in a direction tending to balance the bridge circuit. In the now preferred embodiment of the invention the values of resistor 17, thermistor 19 and strain gages are chosen so that the bridge circuit will be initially unbalanced in a direction so that the potential of output terminal 31 is higher than the potential of output 33. Suitable component values for the bridge circuit 11 are as follows:

Strain gage 13 and 15=120 ohms
Resistor 17=123 ohms
Thermistor 19 is of the positive coefficient type and has an ambient temperature resistance value of 120 ohms For the purpose of providing a control signal for controlling the temperature of the thermistor 19, differential amplifier 35 is operated in the single ended output configuration with output terminal 37 connected to the input of the heater block control circuit 49. In particular, output terminal 37 is connected to the base of transistor 47 through switch 45. The collector of transistor 47 is connected to the positive terminal of a DC voltage source 41 by lead 51 while its emitter is connected to the negative terminal of the DC voltage source 41 by resistor 52 and common return line 53. A power regulating circuit including a voltage reference element 55, specifically a Zener diode, a resistor 57 and a power transistor 59 is connected to the emitter of transistor 47. In particular, the base of transistor 59 is connected to the emitter of transistor 47 by Zener diode 55 and is also connected to the common return line 53 by resistor 57. The emitter of transistor 59 is connected to the common return line while its collector is connected to the positive terminal of the DC source 41 by heating resistors 23.

The differential amplifier 35, heater control circuit 49 and heater block 21 act as a servo system to maintain the thermistor at the required temperature and impedance to balance the bridge circuit. This is accomplished by selecting Zener diode 55 so that it will operate in its Zener region, and therefore conduct, whenever the potential of output terminal 37 is greater than the potential of output terminal 39. Since the differential amplifier 35 is operated in the single ended output configuration the proper Zener voltage for Zener diode 55 may be calculated from the following equation:

$$V_z = V_{out} - V_{be} - V_{be}^1$$

wherein:

$V_{out}$ equals the potential between output terminal 37 and the negative terminal of battery 41 when the bridge circuit is balanced and $V_{be}$ and $V_{be}^1$ respectively are base to emitter potential drops of transistor 47 and 57.

From the foregoing it is seen that under the imposed initial unbalanced condition of the bridge 11, the potential appearing at output terminal 37 of the differential amplifier will initially exceed the Zener voltage of the Zener diode. Under this condition and with switch 45 in the closed position, transistor 59 will conduct current through heater resistors 23 so as to increase the temperature of the thermistor 19 by the resultant power dissipation. The increase in temperature of the thermistor changes its resistance in a direction which tends to balance the bridge circuit 11.

As the bridge 11 becomes balanced, the error signal applied to the differential amplifier becomes smaller and the potential of output terminal 37 with respect to the negative terminal of DC source 41 decreases and the potential of output terminal 39 increases. At some point the potential of output terminal 37 decreases sufficiently so that the voltage applied to Zener diode 55 is below its Zener voltage and the conduction of Zener diode will be limited. Resistor 57 provides a current path for the leakage current through the Zener diode and its value is selected to ensure non-conduction of transistor 59.

It will be understood that switch 45 may be left in the closed position until use of the bridge circuit 11 as a strain gage transducer is desired. When it is desired to use the bridge circuit 11 for measuring strain, switch 45 is placed in an open position so that unbalance of the bridge circuit caused by the applied strain will not cause an error signal to be applied to the heater block control circuit 49.

It is to be realized, of course, that while a specific manner has been described for providing initial bridge unbalance, (that is by selecting approximately the same resistance values for strain gages 13 and 15 and thermistor 19 and a slightly larger value for bridge completion resistor 17) various other combinations of resistance values would be evident to one skilled in the art for achieving initial bridge unbalance in a predetermined direction. Since these and many other variations are considered within the realm of those skilled in the art without departing from the teaching of the present invention, this invention should be considered as being limited only according to the following claims.

I claim:

1. A self-balancing strain gage transducer comprising:
   a bridge circuit having an active branch and a ratio branch, said active branch including at least one straing gage resistor and said ratio branch including impedance means for initially unbalancing said bridge in a predetermined direction, said impedance means including a thermally responsive resistor;
   sensing means connected to the output of said bridge circuit for generating an error signal in response to said bridge circuit unbalance; and
   control means selectively connected to said sensing means and responsive to said error signal for varying the temperature of said thermally responsive resistor and consequently its resistance in a direction tending to balance said bridge circuit.

2. The apparatus of claim 1 wherein said ratio branch comprises a first arm and a second arm, said first arm including said thermally responsive resistor and said second arm including a bridge completion resistor; and said active branch includes a first arm and a second arm having a strain gage in at least one of said arms.

3. The apparatus of claim 2 wherein said sensing means comprises a differential amplifier having its input connected to the junction of said first and second arms of said active branch and to the junction of said first and second arms of said ratio branch.

4. The apparatus of claim 3 wherein said control means includes a heater positioned in heat exchanging relationship with said thermally responsive resistor.

5. The apparatus of claim 4 wherein said control means includes:
   a source of DC voltage;
   a transistor having base, emitter and collector electrodes;
   means connecting the collector-emitter circuit of said transistor and said heater in series across said DC voltage source; and
   a Zener diode and an electrical switch coupled in series between the base of said transistor and said differential amplifier such that said transistor is rendered conductive when said bridge circuit is unbalanced and non-conductive when said bridge circuit is balanced.

References Cited

UNITED STATES PATENTS

| | | | |
|---|---|---|---|
| 2,681,564 | 6/1954 | Jeromson et al. | 73—88.5 XR |
| 2,729,396 | 1/1956 | Impey et al. | 323—75 XR |
| 2,769,071 | 10/1956 | Ward | 323—75 XR |
| 2,846,646 | 8/1958 | Van Santen | 73—88.5 XR |
| 3,085,431 | 4/1963 | Yerman et al. | 73—204 |
| 3,307,398 | 3/1967 | Exon | 73—304 |
| 3,335,606 | 8/1967 | Scarpa | 73—204 |

CHARLES A. RUEHL, Primary Examiner